(12) United States Patent
Davis

(10) Patent No.: US 8,307,642 B2
(45) Date of Patent: Nov. 13, 2012

(54) HYDRAULIC MOTOR USING BUOYANT AND GRAVITATIONAL FORCES TO GENERATE KINETIC ENERGY

(76) Inventor: Stephen E. Davis, Kissimmee, FL (US)

( * ) Notice: Subject to any disclaimer, the term of this patent is extended or adjusted under 35 U.S.C. 154(b) by 330 days.

(21) Appl. No.: 12/802,749

(22) Filed: Jun. 14, 2010

(65) Prior Publication Data

US 2010/0319339 A1    Dec. 23, 2010

Related U.S. Application Data

(63) Continuation-in-part of application No. 12/156,614, filed on Jun. 3, 2008, now Pat. No. 7,765,804.

(51) Int. Cl.
*F03B 17/02* (2006.01)
*F03B 17/06* (2006.01)
(52) U.S. Cl. ............................................ 60/495; 60/640
(58) Field of Classification Search .................... 60/372, 60/495, 496, 639, 640, 675
See application file for complete search history.

(56) References Cited

U.S. PATENT DOCUMENTS

| 442,400 | A | * | 12/1890 | Scantlebury | 60/496 |
|---|---|---|---|---|---|
| 2,989,839 | A | * | 6/1961 | Croy | 60/716 |
| 5,996,344 | A | * | 12/1999 | Frenette et al. | 60/496 |
| 6,644,026 | B2 | * | 11/2003 | Shimshi | 60/495 |
| 7,363,760 | B1 | * | 4/2008 | McCrea | 60/517 |

* cited by examiner

*Primary Examiner* — Thomas Denion
*Assistant Examiner* — Christopher Jetton

(57) ABSTRACT

A motor mounted on a structural support with a pivot at its center line which comprises a cylindrical vessel for holding a fluid in a closed system and in which a buoyant cylinder containing a lighter fluid is allowed to free float so that a continuous chain attached to each end of the buoyant cylinder may be used to transfer energy to a energy storage unit, a crank or a generator. A weighted piston that operates in a pressure tank which force a compressed gas against the piston through pre-sequenced automatic activated valves to force the piston to rise a re determined distance, causing the motor to become top heavy and rotate 180 degrees by gravity and relocks in place to repeat the cycle.

15 Claims, 4 Drawing Sheets

SECTION DETAIL A-1
OF HYDRAULIC MOTOR 10
AT THE END OF A CYCLE

SECTION DETAIL A-1
OF HYDRAULIC MOTOR 10
AT THE END OF A CYCLE

SECTION DETAIL B-1
OF HYDRAULIC MOTOR 10
AT MID CYCLE

ELEVATION PROFILE
SHOWING EXTERIOR GEAR SYSTEM
OF HYDRAULIC MOTOR 10

TOP VIEW OF
HYDRAULIC MOTOR 10

HYDRAULIC MOTOR USING BUOYANT AND GRAVITATIONAL FORCES TO GENERATE KINETIC ENERGY

This is a "continuation-in-part" for application Ser. No. 12/156,614, filed Jun. 3, 2008, now U.S. Pat. No. 7,765,804.

CROSS REFERENCE TO RELATED APPLICATIONS

References Cited

Referenced By

U.S. Patent Documents

| 3,194,008 | July 1965 | Baumgartner | 60/495 |
| 3,961,479 | June 1976 | Anderson | 60/496 |
| 5,996,344 | December 1999 | Frenette, et.Al | 60/496 |
| 4,718,232 | January 1988 | Willmouth | 60/496 |
| 4,683,720 | August 1987 | Deshon | 60/495 |

STATEMENT REGARDING FEDERALLY SPONSORED RESEARCH OR DEVELOPMENT

"Not Applicable"

REFERENCE TO SEQUENCE LISTING, A TABLE, OR A COMPUTER PROGRAM LISTING COMPACT DISC APPENDIX

"NotApplicable"

BACKGROUND OF THE INVENTION

The present invention relates to the field of hydraulic motors and, more particularly, to a hydrodynamic mechanical motor that uses a combination of buoyancy and gravity to create kinetic energy that can be converted into electrical energy.

Motors using fluids as their principal source of energy have typically been thought of as either novelties or as large hydro turbine units associated with flowing bodies of water such as rivers or dams. In the past, buoyancy motors were typically constructed so that air or gas is placed in a chamber that was suspended in a fluid, which was part of an open tank system. These systems were generally problematic and could not be easily scaled to run a generator. With the foregoing in mind, the present invention comprises a motor that advantageously provides a potentially low cost, energy-efficient apparatus and method for generating kinetic energy by using the displacement of water by a buoyant drive cylinder within a fluid filled portable closed chamber balanced on a structural support system, at its center line, and able to rotate 180 degrees between cycles by the raising of a weighted piston located in a pneumatic pressure tank powered by compressed gas, in order to create an overturning moment of inertia. The buoyant force of the motor creates energy that is transferred through a pulley or gear system to run a generator. The buoyant force created (Archimedes Law) is equal to the weight of fluid displaced by the drive cylinder within the closed fluid filled reservoir chamber.

On a small scale this invention presents a delightful amusement, which can be used to entertain children or as an executive entertainment. On a much larger scale, it is envisioned that the motor would be operated as a single unit or as a large number of the individual units described herein that would be connected in such manner as to allow the energy created by the cycle of one unit to be added to the energy created by the cycle of next unit so that a generator could be run continuously to generate electricity or to charge a bank of batteries.

BRIEF SUMMARY OF THE INVENTION

It is an object of the present invention to provide a hydraulic motor able to capture the potential energy of a free floating buoyant drive cylinder. The buoyant drive cylinder is contained in a portable closed vertical reservoir chamber, balanced on a structural support system and held in place by a low voltage operated keeper pin at its center line and able to rotate 180 degrees when said keeper pin is retracted. The reservoir chamber is filled with a fluid heavier than the buoyant drive cylinder, thus providing lift to the lighter buoyant drive cylinder, according to Archimedes Law. The said buoyant drive cylinder will have a chain or other tension member attached to its top end and bottom end, so that the buoyant drive cylinder is able to transfer the buoyant force to the interior and exterior gear system. The chain will attach to the interior gear system and exterior gear system consisting of a sprocket and a common shaft at each interior and exterior end of the reservoir chamber. The shafts will penetrate through the walls of the reservoir chamber by way of sealed bearings, able to transfer energy to the exterior gear system as the buoyant drive cylinder floats to the top.

The hydraulic motor creates energy that is transferred through the exterior gear system in order to drive a generator. When the buoyant drive cylinder reaches the top of the reservoir chamber, one cycle of the hydraulic motor is completed. At this point, the hydraulic motor is designed to overturn by gravity 180 degrees upon the retraction of a low voltage electric keeper pin, which holds the hydraulic motor in place. The hydraulic motor is caused to become top heavy by the raising of a specifically weighted piston located in a pneumatic pressure tank to a specified distance above the reservoir tank, creating an overturning moment causing the apparatus to become top heavy and rotate 180 degrees. Pressure is introduced into the pneumatic pressure tank, in order to drive the weighted piston a specified distance above the reservoir tank, by way of low-voltage pneumatic inlet valves, attached to a primary pressure tank by pressure hoses or pipes. The primary pressure tank is kept constantly pressurized by an electric pneumatic pressure pump, switched on and off as a predetermined minimum or maximum pressure is reached.

As the motor is rotated 180 degrees, it is relocked into place by the low voltage keeper pin which simultaneously shuts off the low voltage pneumatic pressure valves, and exhaust valves. At this point, the motor is starting a new cycle with the buoyant drive cylinder now relocated on the bottom, again rising to the top of the reservoir chamber, driving the generator, and producing electrical energy. The motor is designed to rotate 180 degrees and start a new cycle every time the buoyant drive cylinder reaches the top of the reservoir chamber.

BRIEF DESCRIPTION OF THE DRAWINGS

Some of the features, advantages, and benefits of the present invention having been stated, others will become apparent as the description proceeds when taken in conjunction with the accompanying drawings, presented solely for exemplary purposes and not with intent to limit the invention thereto, and in which.

DETAILED DESCRIPTION OF THE INVENTION

The present invention will now be described more fully hereinafter, in which the description of the preferred embodiments of the invention are discussed. Unless otherwise defined, technical and scientific terms used herein have the same meaning as commonly understood by one of ordinary skill in the art to which this invention pertains. Although methods and materials similar or equivalent to those described herein can be used in the practice of testing of the present invention, suitable methods and materials are described below. In addition, the materials, methods and examples given are illustrative in nature only and not intended to be limiting. Accordingly, this invention may be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description.

Figure 1:
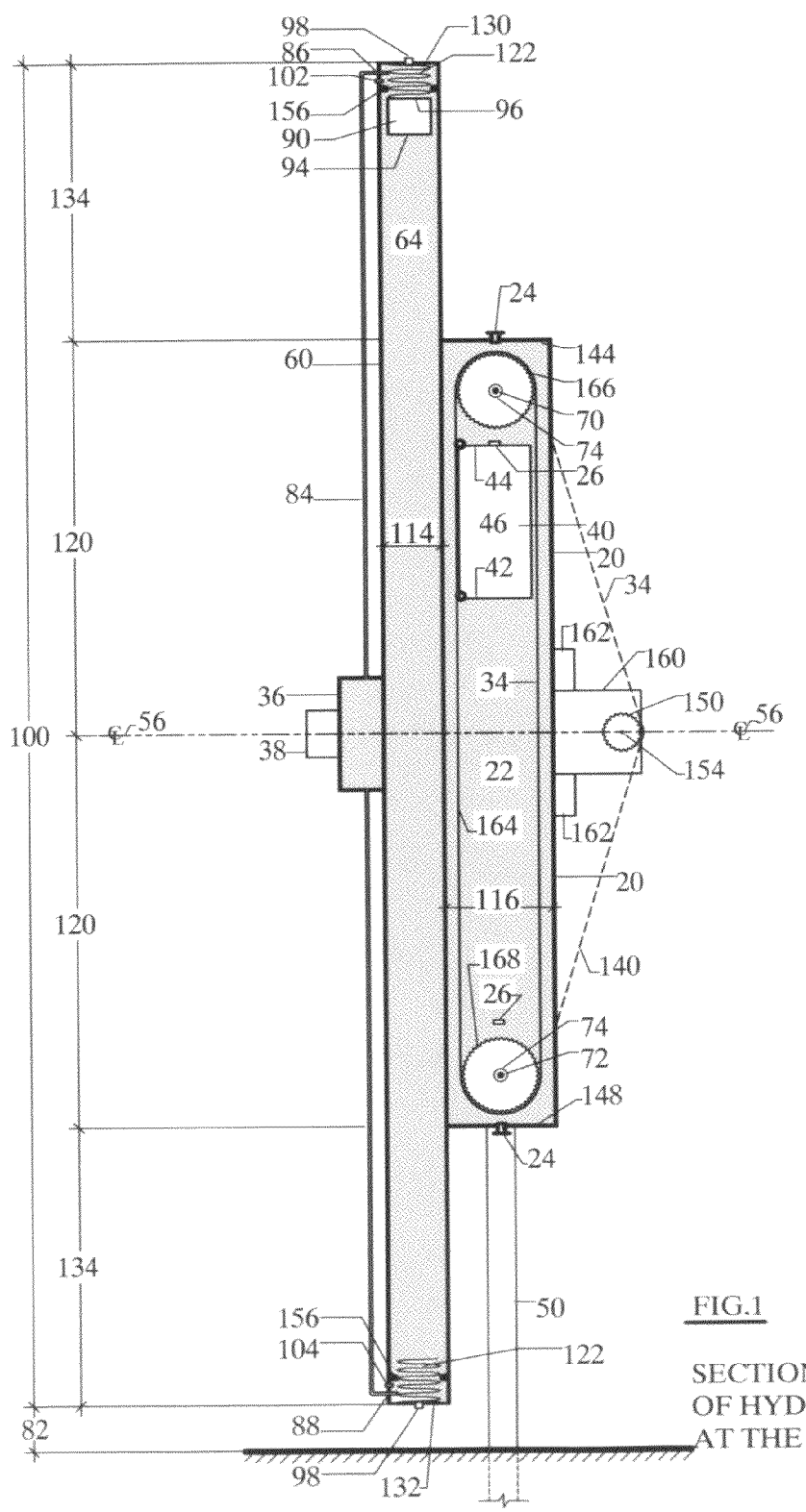
FIG. 1 is a vertical cross-section view of a hydraulic motor showing a weighted piston in its pneumatic pressure tank and the sprocket gear system and buoyant drive cylinder in the reservoir chamber at the end of a cycle according to an embodiment of the present invention.
Figure 2:
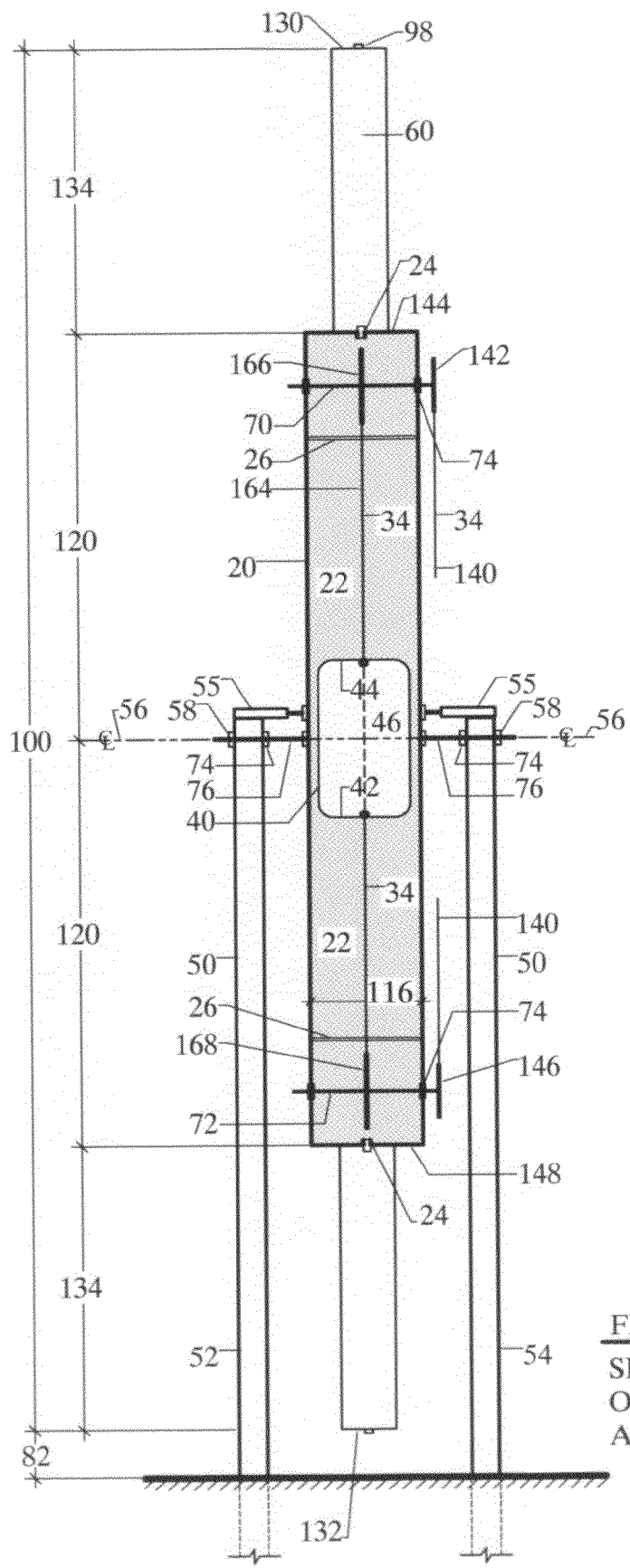
FIG. 2 is a frontal vertical cross-section view of a hydraulic motor showing how the apparatus would be found between cycles according to an embodiment of the present invention.

This invention relates to a hydraulic motor 10, as shown in FIGS. 1 and 2. The motor 10 is comprised of a long primary vessel 20 balanced on a support structure 50 and having a free floating buoyant drive cylinder 40 contained therein. The buoyant drive cylinder 40 is attached to an interior gear system 164 within the primary vessel 20, which consists of a continuous chain 34 and a sprocket 166 and a common shaft 70 located at the first end 144 of the primary vessel 20, and a sprocket 168 and a common shaft 72 located at the second end 148 of the primary vessel 20. The shafts 70 and 72 will penetrate through the wall of the primary vessel 20 by way of two or more sealed fluid tight bearings 74 in order to transfer the energy created by the buoyant drive cylinder 40, to the exterior gear system 140, attachably to drive the generator 160 by way of a continuous chain 34.

FIG. 1 is a vertical cross-section view of the motor 10 that illustrates the placement of the weighted piston 90, and shows how the apparatus would be found at the end of the operating cycle before rotation. As used in this specification, an operating cycle is the time needed for the motor to be released from its starting position, to rotate to a position 180 degrees from the starting point and relocking in its vertical position and to have all its internal components recover, causing the buoyant drive cylinder 40 to be relocated to the bottom of motor 10 and begin rising due to the buoyant force, again repeating the cycle. In FIG. 1 and FIG. 2, the motor comprises a primary vessel 20, which is narrow in its cross sectional diameter 116 relative to its length. The primary vessel 20 may have any cross sectional geometry, but cylindrical geometry is preferable to minimize energy loss due to turbulent forces created by the flow of a primary fluid 22 contained in the primary vessel 20 during operation. The primary vessel 20 will have a calculated length 120 located an equal distance above and below the center line 56 of motor 10. The primary vessel 20 will have at least two fluid inlet nozzles 24, with grease fittings shown in FIG. 1, at end 144 and end 148 for the introduction of the fluid 22 and lubricant as needed for the chain 34 into the primary vessel 20. At the present time, water is considered to be the preferred fluid for this application; however for outdoor use, where such use is temperature and climate dependent, other fluids or additives such as antifreeze or other low freezing point fluids, are contemplated. Similarly, the materials of construction of the tank 20 and its inlet nozzles 24 and gear system 164 will need to be made of materials that are compatible with fluid 22 chosen in order to minimize corrosion, stress, cracking, embrittlement, or other material interactions. At each end, 144 and 148 of the primary vessel 20 will be at least one stop bar 26 in order to keep the buoyant drive cylinder 40 isolated from damage due to the sprockets 166 and 168 at the end of a cycle. Said stop bar 26 will be of such material to withstand the pressure of the buoyant force of the buoyant drive cylinder 40, and be padded. Metal is the desired material for the stop bar 26. The stop bar 26 will be padded with a softer less dense material such as a teflon or styrofoam laminated to said stop bar 26 in order the prevent damage to the buoyant drive cylinder 40. The first end 144 and the second end 148 of the primary vessel 20 should be designed to be removable for future maintenance. A threaded fitting is contemplated for this application, but other similar devices could be used. Inside the primary vessel 20 is a buoyant drive cylinder 40 having a bottom surface 42 and a top surface 44. The buoyant drive cylinder 40 is designed to free float within the primary vessel 20 without creating friction. The buoyant drive cylinder 40 is preferably a cylinder, but can have a geometric cross section primary vessel 20, so that the buoyant drive cylinder 40 is free to move in response to the force exerted on it by the fluid 22, according to Archimedes Law. In a preferred embodiment, air is considered to be the preferred fluid 46; however, any other theoretically suitable fluid or solid such as Styrofoam, or Urethane that is less dense than the fluid 22 may be used.

The motor 10 is held in place by a support structure 50 comprising at least two support legs 52, 54 and a low voltage locking device 55, shown in FIG. 2, which holds the primary vessel 20 and pressure tank 60, shown in FIG. 1, in a vertical position, an equal calculated distance 134 above and below a system centerline 56. The primary vessel 20 supports pressure tank 60, and their contents and are held in place by a pivot 58 at the system centerline 56 that includes at least one bearing 74 and a shaft 76 on each side of the motor that allows the motor 10 to rotate freely about the pivot 58 once the locking system 55 is retracted. The support structure 50 is situated a distance above grade 82, which permits the motor 10 to clear the ground, or surface.

Adjacently connected to the primary vessel 20, is a pressure tank 60, as shown in FIG. 1, with a diameter 114 to house a weighted piston 90. Pressure tank 60 will have a predetermined length 100, extending a specified distance 134, equally above and below the center line 56 and the primary vessel 20. The pressure tank 60, being extended the calculated distance 134 above primary vessel 20 and the weighted piston 90, being pneumatically forced against the piston stop 156, and shock spring 122 located at the end, 130 of pressure tank 60, in FIG. 1 will make motor 10 become top heavy, creating an overturning moment of inertia, able to rotate motor 10, 180 degrees.

Located at the centerline 56 on pressure tank 60, is the primary pressure tank 36 bracketed to the primary vessel 20. Mounted at the center line 56 to the primary pressure tank 36 is a pneumatic pressure pump 38 powered by the onboard generator 160 also attached to the primary vessel 20 at the centerline 56. The power for the pneumatic pressure pump 38 could also be powered by solar, conventional power or rechargeable batteries being charged by generator 160. For this application the onboard generator 160 is used directly to power the pressure pump 38 between cycles. The pneumatic pressure pump 38 will pressurize fluid 64, thus pressurizing the primary pressure tank 36 to a specified maximum pressure. When a maximum design pressure is reached in the primary pressure tank 36, a pressure switch on the pneumatic pressure pump 38 (not shown) will switch the power off as required to the pneumatic pressure pump 38, or switch the pneumatic pressure pump 38 on when the pressure drops below a minimum design pressure. The pressurized fluid 64 will be released from the primary pressure tank 36 into the pressure tank 60, through the pressure hoses or pipes 84 connecting the primary pressure tank 36 and the pressure tank 60. Where the pressure hoses or pipes 84 attach to the pressure tank 60, there will be low voltage pneumatic pressure inlet valves 86 on end 130 and 88 on end 132. Each of the two inlet locations on said pressure tank 60, will be pre-set and sequenced to electronically switch either on or off to let the pressurized fluid 64 from the primary pressure tank 36 to either enter or stop from entering pressure tank 60. Pressurizing tank 60, with fluid 64 will force a weighted piston 90, up against the respective piston stop 156 and shock spring 122 on end 130 as shown in FIG. 1 causing motor 10 to become top heavy and able to rotate 180 degrees.

Located in pressure tank 60 shall be a pneumatic driven specifically weighted piston 90 with a top surface 96 and a bottom surface 94 located between two piston stops 156, within the pressure tank 60. Each piston stop 156 will house a shock spring 122 to reduce the impact of the weighted piston as it is driven to the top of the pressure tank 60. The weighted piston 90, is a preferable cylinder, but can have any geometric cross section suitable for the application. The weighted piston 90, will be of a material able to withstand pneumatic pressures required to drive it from one end, 132 of the pressure tank 60 to the other end 130 as shown in FIG. 1. A metal casing lead filled is the desired material for the weighted piston, but any other suitable material may be used. The weighted piston should be fitted with one or more flexible airtight compression rings (not shown) or have a close tolerance to minimize fluid 64 pressure from leaking around the piston 90, within the pressure tank 60. The material for the flexible compression rings (not shown), should be the same as the piston 90, or, any other material suitable for the application. The inside surface of pressure tank 60, should be of such material to withstand the wear caused by the periodic movement of the weighted piston 90 and piston rings (not shown) as the piston 90, is forced against the piston stops 156 and shock spring 122. The pressure tank fluid 64 may be any gas able to be compressed in order to drive the weighted piston 90. Air is considered to be the preferred fluid 64 for this application, taken directly from the exterior, to be introduced into the pneumatic pressure pump 38 in order to pressurize the primary pressure tank 36. The piston stops 156 are attached to both ends, 130 and 132, of pressure tank 60, to allow a space for the pneumatic low voltage inlet valves 86, 88 and the low voltage exhaust valves 102, 104 and the shock springs 122.

All the valves will be sequenced to open or close, as further described herein; upon reactivation of the locking device 55 at the beginning of a cycle.

On pressure tank 60, there are located low voltage electric exhaust valves 102,104 to exhaust or contain fluids 64, located at the same location as said low voltage pneumatic inlet valves 86, 88, shown in FIG. 1. The low voltage exhaust valves 102, 104 will be sequenced to open or close at a pre-designated time, allowing fluid 64 able to be pressurized or allow fluid 64 to be evacuated from said pressure tank 60.

The electronic valves will be sequenced as follows: When the hydraulic motor 10 is at the end of a cycle shown on FIG. 1, and the buoyant drive cylinder 40 reaches the top of surface 144 of the primary vessel 20, all the valves will be electronically activated. The low voltage pneumatic electric inlet valve 88 located on pressure tank 60 between surface 132 and the piston stop 156 will be caused to open, and the low voltage pneumatic electric exhaust valve 104 will be caused to close at the same location. The low voltage pneumatic electric inlet valve 86, located on pressure tank 60 between surface 130 and the piston stop 156 will be caused to close and the low voltage pneumatic electric exhaust valve 102 at the same location will be caused to open to release the pressurized fluid 64 causing the weighted piston 90 to be pneumatically forced up against piston stop 156, and shock spring 122, at surface 130 of pressure tank 60. Upon weighted piston 90 reaching the top of piston stop 156 and shock spring 122, the low voltage activated locking mechanism 55 is electronically released and the hydraulic motor 10 rotates 180 degrees due to being top heavy. When the locking mechanism 55 is automatically reactivated to lock motor 10 in the vertical position, after rotation, all of the low voltage electric valves, 86, 88, 102, and 104 will be made to close, starting a new cycle. Upon the buoyant drive cylinder 40, now relocated on the bottom of motor 10, near surface 144 of the primary vessel 20, again floats up to, and reaches the top of the motor 10, now surface 148 of the primary vessel 20, all the valve sequences noted above will be made to electronically switch opposite to what they were before the 180 degree rotation of motor 10, in sequence, causing the weighted piston 90 to again rise in pressure tank 60, repeating the sequence of events noted above.

The low voltage pneumatic pressure inlet valves 86, 88 and the low voltage pneumatic exhaust valves 102, 104 and locking device 55 will be powered by rechargeable batteries 162, shown in FIG. 1, located next to the generator 160 and charged by the generator 160 when in operation, located equal distance above and below center line 56.

An airtight oil or lubricant port with drain plug 98 to introduce a lubricant will also be added to further support the reduction of friction between the pressure tank 60, and the pneumatic weighted piston 90, as necessary. The ports within drain plug 98 will be located on the exterior surface 130 and 132 of the pressure tank 60, shown in FIG. 1.

The overall length 100 of the pressure tank 60, should be at least sufficient to house its weighted piston 90, inlet valves 86, 88, exhaust valves 102, 104, piston stops 156 and shock spring 122. Pressure tank 60 shall be extended an equal calculated distance 134 above and below each end 144, 148 of the primary vessel 20, so when the weighted piston reaches the top of pressure tank 60 due to the pneumatic force of fluid 64 acting on the weighted piston 90, the center of gravity is shifted upward from the centerline 56 a sufficient calculated distance 134, above the primary vessel 20, to cause the motor 10 to become top heavy due to the increased moment of inertia so that gravity overturns the motor 10, to start a new cycle.

The skilled will recognize that once the motor moves past the center of gravity, the force of gravity acting on it causing the fluid 22 within the primary vessel 20 to flow in a non-uniform manner. In order to prevent this flow from becoming turbulent, a braking mechanism is needed in order to maintain a relatively uniform velocity during the 180 degree rotation of motor 10 which will occur only at the end of one cycle, when the low voltage locking mechanism is released. In the preferred embodiment, slowing the speed of rotation will be provided by balancing the over turning moment in relation to the weight of motor 10 by not being excessively top heavy, thus slowing the rotation of motor 10. A hydraulic mechanism may also be considered to slow the rotation of motor 10 (not shown).

Figure 3:
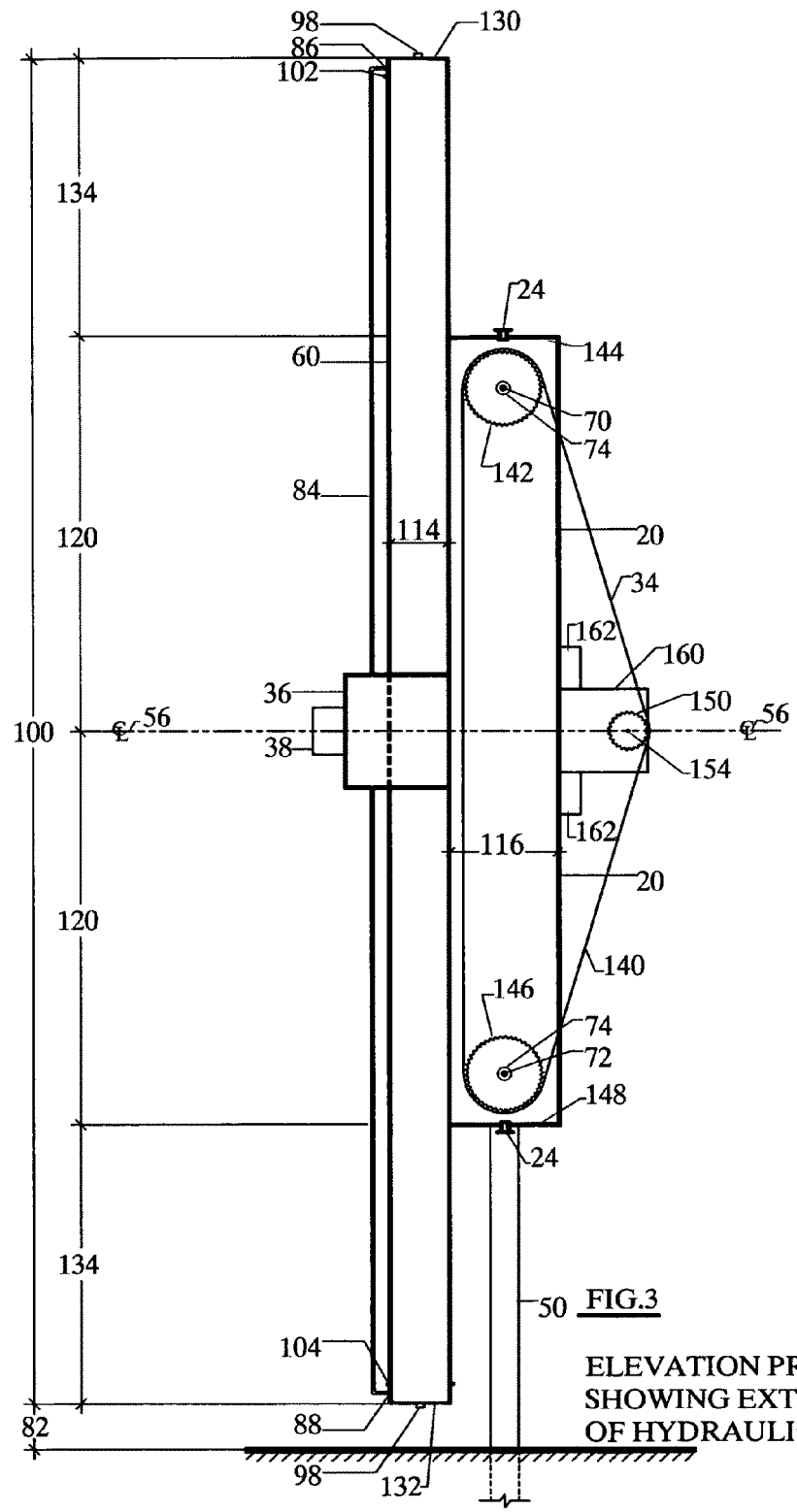
FIG. 3 is a elevation profile of a hydraulic motor showing the exterior gear system attached to a generator according to an embodiment of the present invention.
Figure 4:
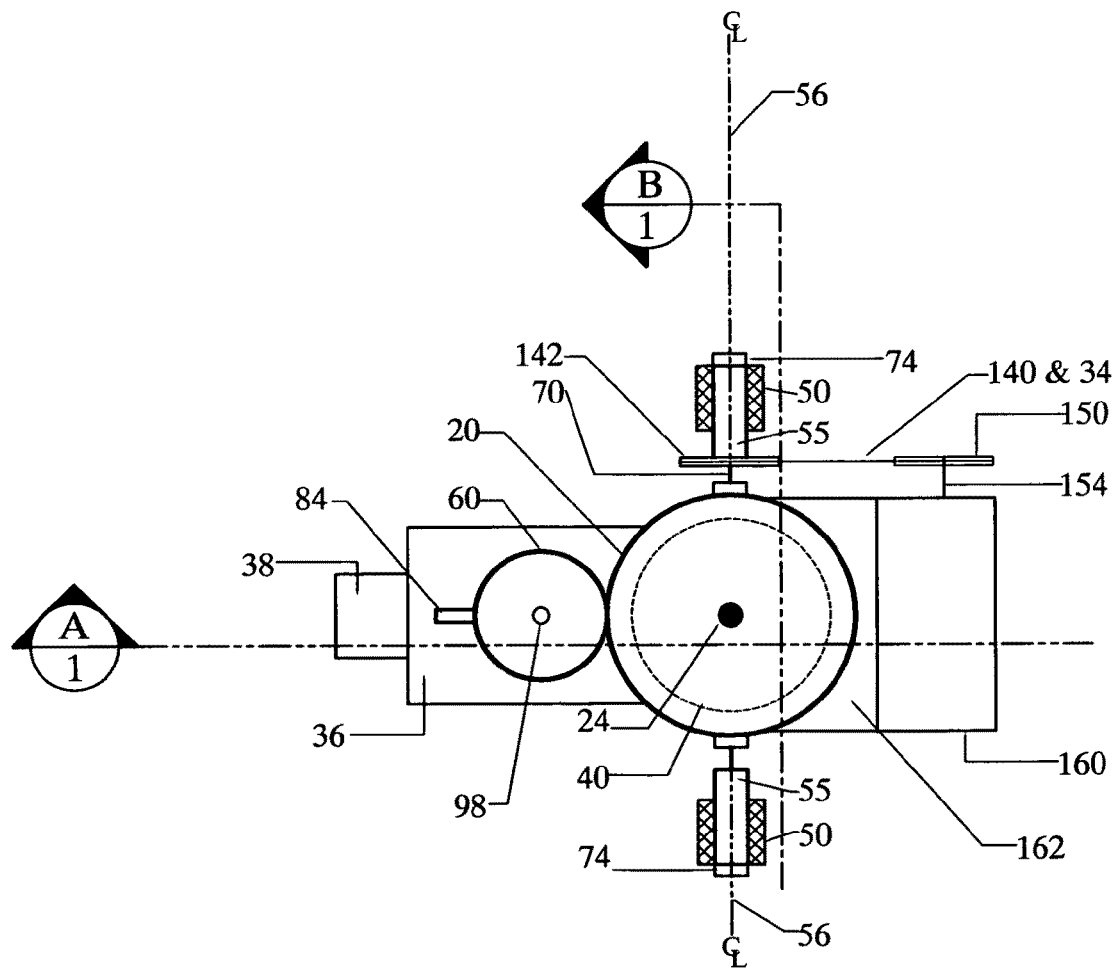
FIG. 4 is a top view of a hydraulic motor according to an embodiment of the present invention.

The exterior mounted gear system 140, in FIG. 3, mounted to the primary vessel 20 comprises a first sprocket 142 connected to drive chain 34 mounted to a common exterior support shaft 70 and bearing 74 of a first end 144 of the primary vessel 20, a second sprocket 146 connected to drive chain 34 mounted to a common exterior support shaft 72 and bearings 74 of a second end 148 of the primary vessel 20 and a third sprocket 150 mounted to a generator shaft 154 cranking the generator 160 shown in FIG. 3.

The interior gear system shown in FIG. 1 and mounted to the interior of the primary vessel 20, comprises a first sprocket 166 and drive chain 34 mounted to a common support shaft 70 and bearings 74 of a first end 144 of the primary vessel 20, a second sprocket 168 and drive chain 34 mounted to a common support shaft 72 and bearings 74 of a second end 148 of the primary vessel 20. Both shafts 70 and 72 penetrate through the bearings 74 and exterior walls of primary vessel 20 and attach to the exterior gear system 140.

The gear system 140 and 164 will provide a means for harnessing the energy created by the movement and force of the buoyant drive cylinder 40, (Archimedes Law) and for transferring the energy produced to crank a generator 160, where it can be converted into a more useful form of energy, such as electric or mechanical energy. The amount of energy produced will be determined by the length and the diameter 116 of the primary vessel 20 and the size of the buoyant drive cylinder 40.

All valves, 88, 86, 102 and 104 in pressure tank 60 are closed until buoyant drive cylinder 40, shown in FIG. 1 reaches the top of the primary vessel 20 at the end of a cycle. At this time pressure, inlet valve 88 is caused to be open on pressure tank 60 near end 132 and exhaust valve 102 is caused to be open near end 130 of pressure tank 60. Upon valves 88 and 102 being open, causes the weighted piston 90 in pressure tank 60, to be forced to the first end 130 of the pressure tank 60 against the piston stop 156 and shock spring 122 by the compressed pneumatic force of the fluid 64. The pneumatic pressure, to drive weighted piston 90 is introduced into pressure tank 60 through the pressure pipes 84 attached to the primary pressure tank 36 thru the open low voltage pneumatic inlet valve, 88 causing motor 10 to rotate 180 degrees and begin a new cycle. The primary pressure tank 36 is kept charged with the high pressure fluid 64 by way of a pneumatic pressure pump 38 operated by the onboard generator, only between cycles as the buoyant drive cylinder 40 is floating toward the top of motor 10 producing energy. The pneumatic pressure pump 38 will engage only when the pressurized fluid 64 is below a minimum specified pre-design pressure in the primary pressure tank 36 and will continue to operate until the maximum design pressure is reached in the primary pressure tank 36 for fluid 64. The on and off control of the pneumatic pressure pump 38 will be by an automatic pressure switch controlled by a pressure gauge (not shown) within the pneumatic pressure pump 38. It is envisioned that the primary pressure tank 36 will operate between 100 and 140 psi when the compressed fluid 64 is released into the pressure tank 60. The pressure in the primary pressure tank 36 could be designed to operate at much larger pressures as a design may dictate for future applications and larger piston weights 90 to be lifted by pressurized fluid 64. Please note that the pressure released into the pressure tank 60, will multiply the lifting force on the pistons 90, by the area of the piston surface. Pressure times the surface area will equal the lift force of the piston 90. Let it be known that a hydraulic pump and hydraulic ram could be used in place of the pneumatic air pumps to lift the weighted piston 90, this could be an option for future designs and should not be construed as limited to the illustrated embodiments set forth her in.

Prior to operation, the motor 10 is held in place vertically by a pair of electronic or magnetic locks 55, which hold the primary vessel 20, the pressure tank 60, and the primary pressure tank 36 in place. At equilibrium, the motor 10 would be balanced about its center of gravity, which is also the system centerline 56, as shown in FIG. 2. However, because of the design of the system, equilibrium is not a static condition due to the weighted piston 90 being extended above the centerline 56 and the location of the drive cylinder 40.

The motor 10 is designed to operate using the buoyant force of the fluid 22 contained in the primary vessel 20, Archimedes Law, to raise a buoyant cylinder 40, which is filled with a lighter, less dense fluid 46, so that the buoyant cylinder 40 floats in more dense fluid 22 toward the top of the primary vessel 20 driving the gear system 140 to run the generator 160. When a weighted piston 90 is acted upon by the compressed pneumatic force of the fluid 64, in pressure tank 60, the weighted piston 90 will be forced out beyond the primary vessel 20, by a calculated distance 134 shown in FIGS. 1, 2 & 3.

This change due to the compressed pneumatic force acting on the weighted piston 90, shifts, the center of gravity and moment of inertia upward, and the motor 10 becomes top heavy. Momentum is created about the centerline 56 causing the top heavy motor 10 to tip toward a new center of gravity defined by the combination of the motor 10 and the weighted piston 90, however, when the locking devise 55 is retracted, the motor 10 tips, gravity causes it to accelerate and fall passed the new center of gravity so that the first end 144 of the primary vessel 20 accelerates in an arc about the pivot 58 and toward the ground. Completion of this movement of the motor 10 through a 180 degree arc comprises one cycle. The motor 10 is then re-locked into place by the low voltage locking mechanism 55, causing all the electronic valves, 86, 88, 102, and 104 to be closed allowing motor 10 to return to equilibrium, a process that will vary in length of time based upon the weight and dimensions of motor 10, starting a new cycle. Upon the buoyant drive cylinder 40 again reaching the top, (now 148) of the primary vessel 20, a time period depending on the gear system and length of the drive cylinder 20, simultaneously, the sequence of the opening and closing of the low voltage inlet valves, 86, 88 and the sequence of opening and closing the low voltage exhaust valves, 102, 104 are reversed electronically as previously discussed, again forcing the weighted piston 90 toward the top of the pressure tank 60, (now surface 132). At this time the locking mechanism 55 is again released letting the motor 10 repeat the cycle as noted herein.

It is envisioned that as a system is scaled up as a potential energy source for electricity, the cycle times will increase so that a number of single motor units could be grouped together to take advantage of different cycle stages in order to continuously run a generator 160 or charge a bank of batteries. Please note, the longer the primary tank 20, the more energy the system will produce in one cycle before rotation of the motor 10 is commenced and the larger the drive cylinder, the more power is produced to drive a larger generator.

In the specification there have been disclosed typical preferred embodiments of the invention, and although specific terms are employed, the terms are used in a descriptive sense only and not for purposes of limitation. The invention has been described in some detail, but it will be apparent that various modifications and changes can be made within the spirit and scope of the invention as described in the foregoing specification.

I claim:

1. A hydraulic buoyant motor mounted on a structural support system with a pivot at its center line which comprises a primary cylindrical vessel for holding a fluid in a closed system and in which a buoyant cylinder containing a lighter fluid or solid is allowed to free float so that a chain or other tension member attached to either end of the buoyant cylinder may be used to transfer energy, through interior and exterior gear system, to operate an electric generator, attached to said primary vessel, with a pneumatic operated weighted piston housed in a separate pneumatic pressure tank extending a pre-determined distance above and below the primary vessel attachably connected to a pressure storage tank attachably connected to a pneumatic electrical operated pressure pump, which force a compressed gas against the piston through pressure hoses into pre-sequenced automatic activated pressure valves to force the weighted piston to the top of the pneumatic pressure tank at the end of a cycle, which cause the motor to become top heavy, releasing a keeper pin causing the motor to rotate 180 degrees by gravity and then again reactivating the keeper pin, locking the motor in place in order to repeat the cycle.

2. A hydraulic motor of claim 1, wherein a low voltage electrical or magnetic operated keeper pin is used for holding said motor in place before and after rotation of said motor.

3. A hydraulic motor of claim 1, wherein a primary vessel for holding a fluid, said vessel having a first end and a second end, said first end having at least an interior first sprocket attached to a common shaft and bearings and said second end having an interior second sprocket attached to a common shaft and bearings.

4. A hydraulic motor of claim 3, wherein a common shaft penetrating said primary vessel and bearings at the first end attached to an exterior first sprocket at the first end and a common shaft penetrating said primary vessel and bearings at the second end attached to an exterior second sprocket at the second end of the primary vessel and a third sprocket located at the generator operatively connected by said chain in order to transfer energy to said generator.

5. A hydraulic motor of claim 3, wherein a buoyant cylinder filled with a buoyant solid or gas having a bottom surface and a top surface, said buoyant cylinder top surface attachably connected to the first end of said chain and said buoyant cylinder bottom surface attachably connected to the second end of said chain.

6. A hydraulic motor of claim 1, wherein a pressure tank, having a bottom and a top end, said pressure tank adjacently connected to said primary vessel along its length extending above and below said primary vessel a pre-determined distance.

7. A hydraulic motor of claim 6, wherein a pneumatic weighted piston, having a bottom and a top end, said pneumatic weighted piston contained in said pressure tank.

8. A hydraulic motor of claim 6, wherein a series of electrical operated low voltage intake and exhaust valves located on the exterior surface of the pressure tank located between the piston stops and a top surface at the first end and the piston stops and a bottom surface at the second end of the pressure tank.

9. A hydraulic motor of claim 8, where in a piston stop located at a first end and a second end of the pressure tank.

10. A hydraulic motor of claim 9, where in a grease nipple and drain port located at the exterior surface of the first end and the second end of the pressure tank.

11. A hydraulic motor of claim 3, wherein a primary pressure tank connected to said primary vessel at the center line of the primary vessel with a pneumatic electrical operated pressure pump mounted to said primary pressure tank located at the center line of the primary vessel.

12. A hydraulic motor of claim 11, wherein a pneumatic electrical operated pressure pump mounted to said primary pressure tank located at the center line of the primary vessel, able to pressurize said primary pressure tank, able to switch off and on at pre-determined settings, in order to drive the weighted piston when called for at the end of a cycle.

13. A hydraulic motor of claim 9, wherein a shock spring located at a first end and a second end of the said pressure tank.

14. A hydraulic motor of claim 3, wherein a rechargeable battery pack located at the center line of the primary vessel connected to said generator set a the center line of the primary vessel.

15. A hydraulic motor of claim 3, wherein a plug to extract fluid or fill with fluid or lubricate primary vessel located at a first end and a second end of said primary vessel.

* * * * *